United States Patent [19]

Durst

[11] Patent Number: 4,674,968
[45] Date of Patent: Jun. 23, 1987

[54] COMESTIBLE MOLDING APPARATUS

[75] Inventor: Richard E. Durst, Austin, Tex.

[73] Assignee: APV Glacier Industries, Inc., Austin, Tex.

[21] Appl. No.: 783,821

[22] Filed: Oct. 3, 1985

[51] Int. Cl.$^4$ ............................................. A23G 9/14
[52] U.S. Cl. .................................. 425/256; 425/444; 425/562; 426/515
[58] Field of Search ............. 264/102, 328.11, 328.12, 264/DIG. 78, 101, 15, 38; 425/562, 564, 568, 574, 583, 256, 282–286, 420, 276, 212, 288; 426/512, 515

[56] References Cited

U.S. PATENT DOCUMENTS

| | | | |
|---|---|---|---|
| 1,238,429 | 8/1917 | Nielsen | 425/284 |
| 1,726,113 | 8/1929 | Miller | 425/324.1 |
| 1,891,230 | 12/1932 | Marnden | 426/383 |
| 2,412,050 | 12/1946 | Lawrence et al. | 425/282 |
| 2,514,390 | 7/1950 | Hagen | 425/564 |
| 2,603,397 | 7/1952 | Olson | 141/292 |
| 2,719,494 | 10/1955 | Spiess et al. | 425/145 |
| 3,029,750 | 4/1962 | Burt et al. | 425/560 |
| 3,036,533 | 5/1962 | Burt et al. | 426/294 |
| 3,080,830 | 3/1963 | Walter et al. | 425/256 |
| 3,146,282 | 8/1964 | Ninneman | 425/568 |
| 3,350,746 | 11/1967 | Blumer | 425/567 |
| 4,420,948 | 12/1983 | Savage | 62/340 |
| 4,477,473 | 10/1984 | Schoonmaker et al. | 426/231 |

*Primary Examiner*—Jay H. Woo
*Assistant Examiner*—J. Fortenberry
*Attorney, Agent, or Firm*—Lahive & Cockfield

[57] ABSTRACT

A molding apparatus for forming comestible shapes includes a mold block having an open ended cavity formed therein, the cavity having an axis of symmetry generally transverse to a plane of its open end, and movable means for closing the open end during molding to retain the comestible within the cavity. A scraper pivotally mounts at just one point on the mold block for rotation about the axis of symmetry within the cavity, and a conduit valve provides a flow of comestible in a plastic state into the mold cavity. Control means controls the flow of comestible into the cavity, the rotation of the scraper, and the opening and closing of the movable means to permit shaping of the comestible within the mold cavity and release of the shaped comestible from the mold cavity by operation of the valve, the movable means, and the scraper. In one embodiment, a conduit houses a displacement valve controlled to provide a negative flow pressure after filling of the mold. The molding apparatus is mounted for traverses synchronized with a conveyor. In a preferred embodiment, the scraper, the displacement valve and the movable means are powered by pneumatic cylinders, and a sequencing valve controls the actuation of the cylinders. In a production line embodiment, the sequencing valve may be a programmable limit switch operating on an input signal derived from a rotating member of a conveyor belt.

13 Claims, 9 Drawing Figures

COMESTIBLE MOLDING APPARATUS

FIELD OF THE INVENTION

This invention relates to molding apparatus for producing specified shapes of comestibles and more particularly to a molding apparatus having a fixed upper mold cavity and movable sections of a lower mold cavity for producing specific shapes of ice cream.

BACKGROUND OF THE INVENTION

The concept of molds for receiving food in a plastic state and molding it into a specific shape, such as a ball, is well known in the art. In general, prior art devices have often included a fixed upper mold part having a cavity formed therein with movable lower portions acting to close the mold, shape the lower portion of the molded comestible and then, by opening, aid in the release of the comestible in its formed shape. Molds for forming balls of materials such as ice cream, are shown in U.S. Pat. Nos. 3,080,830 and 3,029,750. As can be seen in these patents, an upper fixed half of the mold has a hemispherical cavity and the movable parts of the mold are hinged quadri-spheres which, in the closed position, form the lower half of the ball and open to allow the completely formed ball to be released onto a conveyor plate or the like. Heater jets directed at the quadri-spheres maintain a fluid surface layer of comestible, in order to aid in the release of the shaped balls. A scraper blade pivoted at both ends about a horizontal axis is employed to separate the ball from the upper hemisphere cavity. Various mechanical linkages such as rotating arms and cranks have been employed to control and synchronize the motion of the movable quadri-sphere elements.

A valve for controlling the flow of a comestible substantially as shown in FIG. 6 herein has been previously designed and sold by the applicant several years ago in a device for extruding rosettes onto unconfined ice cream slices in a production line. This valve has the property of reducing extrusion pressure and flow volume as it closes, followed by a negative pressure and flow as the valve plunger continues to retract. Such pressure/flow characteristics closely approximate the characteristics involved in the manual fabrication of rosettes, e.g., using a pastry bag. It is believed that such a valve has not previously been used as a component of a closed pressurized comestible molding system.

SUMMARY OF THE INVENTION

It is an object of the invention to provide a food molding apparatus in which separation during unmolding of the molded food portions from the mold surface is easily accomplished.

It is another object of the invention to provide a food molding apparatus in which mold blocks having a range of shapes may be used, without thereby impairing the efficacy of the unmolding separation.

It is another object of the invention to provide a food molding apparatus in which the unmolding separation introduces no marks or blemishes to the molded product.

These and other features of the invention are achieved in one embodiment by providing a molding apparatus for forming comestible shapes comprising a mold block having an open ended cavity formed therein, the cavity having an axis of symmetry generally transverse to a plane of its open end, and movable means for closing the open end during molding to retain the comestible within the cavity. A scraper pivotally mounts at just one point on the mold block for rotation about the axis of symmetry within the cavity, and a conduit valve provides a flow of comestible in a plastic state into the mold cavity. A control means controls the flow of comestible into the cavity, the rotation of the scraper, and the opening and closing of the movable means to permit shaping of the comestible within the mold cavity and release of the shaped comestible from the mold cavity by operation of the valve, the movable means, and the scraper. In one embodiment, a conduit houses a displacement valve controlled to provide a negative flow pressure after filling of the mold. The molding apparatus is mounted for traverses synchronized with a conveyor. In a preferred embodiment, the scraper, the displacement valve and the movable means are powered by pneumatic cylinders, and a sequencing valve controls the actuation of the cylinders. In a production line embodiment, the sequencing valve may be a programmable limit switch operating on an input signal derived from a rotating member of a conveyor belt.

BRIEF DESCRIPTION OF THE DRAWINGS

These and other features of the invention will be more clearly understood by reference to the drawings in which.

Description of the Preferred Embodiment

Figure 1:
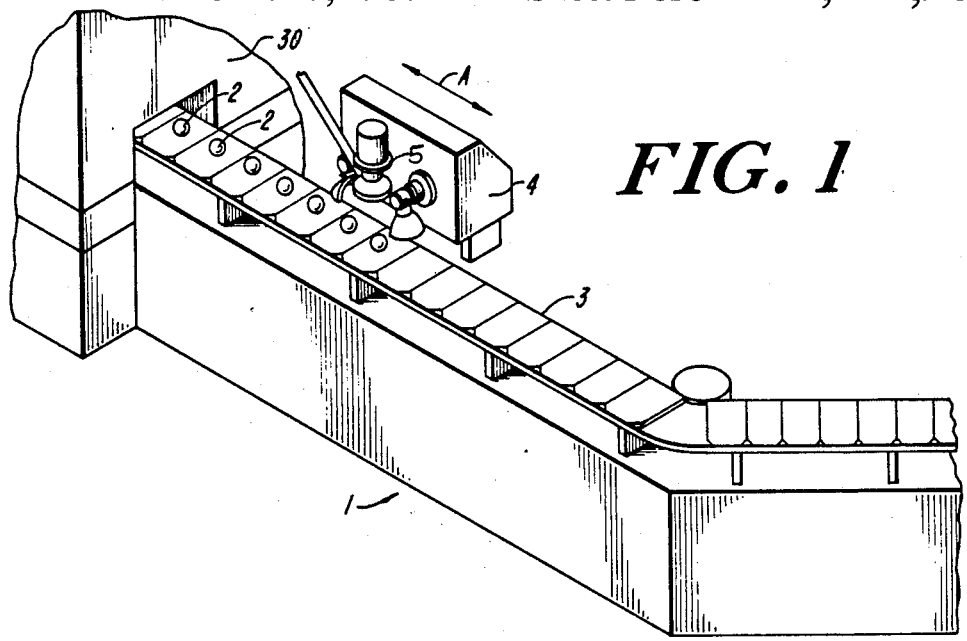
FIG. 1 is a perspective view of an embodiment of the invention, installed in a production system.

FIG. 1 shows a production line 1 for the fabrication of molded food portions 2 from a supply of bulk comestible, in which portions 2 are deposited on a conveyor 3 which may, for instance, carry individual trays, moving past one or more stations 4. Station 4 in FIG. 1 shows a production head 5, referred to herein as a ball nozzle, which molds the portions 2 prior to depositing them on the conveyor 3. The conveyor 3 may then sequentially move past additional production stations, e.g., for coating or topping operations, and may also move through a temperature-controlled chamber 30 to condition the product portions for subsequent treatment or handling.

The ball nozzle 5 receives a flow of bulk comestible which flows under pressure via conduit 6, into a mold 7. Comestible enters mold 7 of the nozzle during a first molding sequence. During a second, unmolding sequence, the mold opens and the shaped portion 2 separates from the mold onto the conveyor beneath the ball nozzle 5. The entire ball nozzle assembly is mounted for motion along repetitive traverses of a region above the conveyor, as indicate,d by the double arrow (A) in the figure, so that as shaped portion 2 is released onto the conveyor, there is no relative lateral motion between the portion and the conveyor which might distort the shape of the portion or displace it from its point of deposit.

Figure 2:
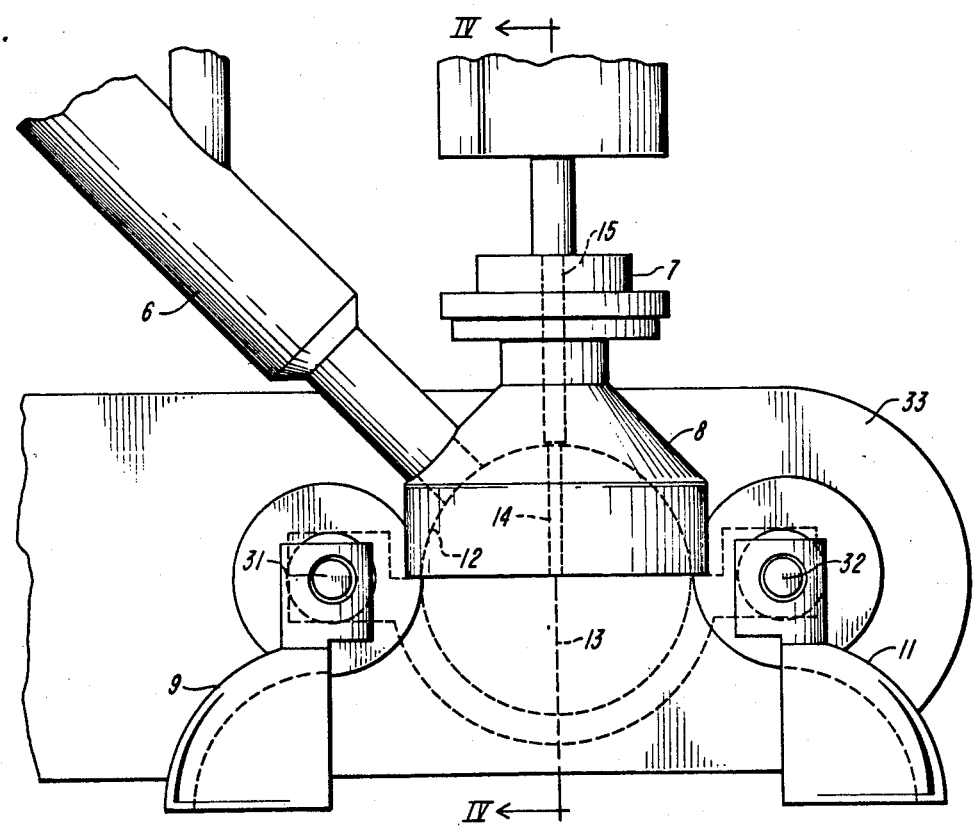
FIG. 2 is a side view of the embodiment of FIG. 1.

FIG. 2 shows further detail of the ball nozzle construction in a side view. Mold 7 comprises an upper fixed part 8 and lower parts 9, 11. Upper part 8 is a mold block, and has an inner surface 12, (shown in phantom) which is a surface of revolution having its axis of symmetry indicated schematically at 13, defining a comestible-receiving cavity. A scraper 14, (also shown in phantom) conformal to the inner surface 12, is attached to shaft 15 oriented along the axis of symmetry 13, so as to pivot at a central point of the scraper. The shaft 15 extends through the surface of upper part 8 to suitable driving means outside of the cavity.

Lower parts 9, 11 in the embodiment shown are each in the shape of a quadri-spherical shell, each mounted to pivot about a horizontal shaft 31,32 from an opened to a closed position. The respective horizontal shafts extend through a rear face plate 33 into a housing in which a suitable drive mechanism causes the lower parts to open and close. Also shown in FIG. 2 is the comestible supply conduit 6 which extends from a source of bulk comestible into the upper part, mold block 8.

In one embodiment, the drive mechanism for each quadri-sphere comprises a circumferentially toothed gear for each shaft, and the two gears engage opposite sides of a double-sided rack. The rack is linearly moved by an air-actuated cylinder, resulting in a simultaneous and opposing opening movement of the two lower quadri-spheres. With such movement, the "pull" on the product introduced by the opening of parts 9, 11 is free of net lateral force on the shaped product.

Figure 3:
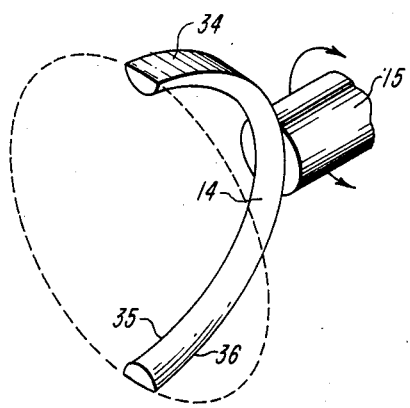
FIG. 3 is a perspective view of the scraper element of the embodiment of FIG. 2.

FIG. 3 is a pictorial view of scraper 14 fitted to surface 12 of the mold block 8. Scraper 14 is a stainless steel blade having an essentially flat or mildly curved outer surface 34 and curved or bevelled forward and backward facing surfaces 35,36 for parting the molded comestible from inner surface 12 of the mold block 8. Scraper 14 is connected by shaft 15 to a drive mechanism outside of the comestible-receiving cavity for rotation of 180° about the shaft axis.

Figure 4:
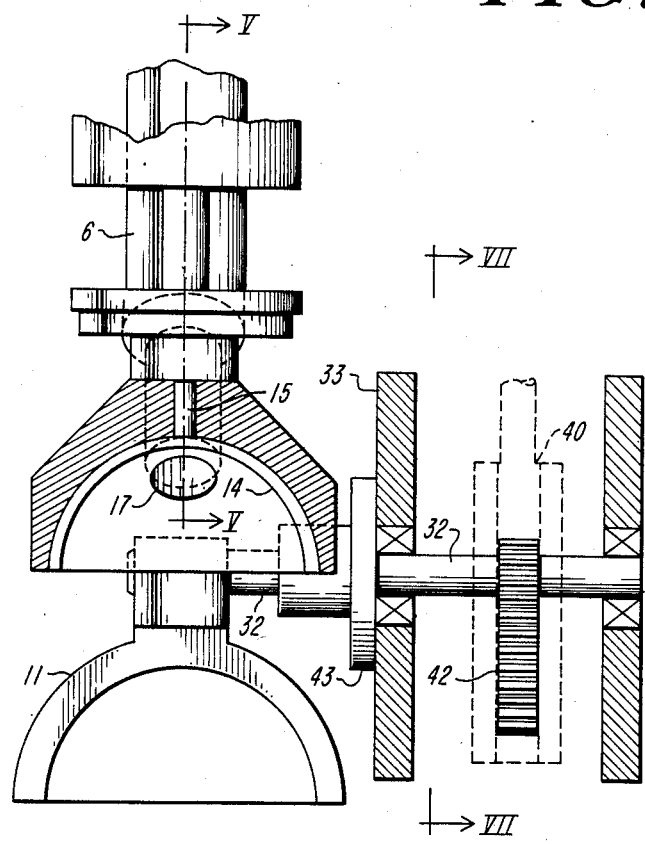
FIG. 4 is a vertical section of the mold of the embodiment of FIG. 2.

FIG. 4 is a vertical section through the top of the mold and scraper, showing the mounting of the scraper 14 therein. Scraper 14 is a formed blade having a profile which, when rotated, sweeps out the inner surface of the mold, so that rotation of the shaft 15 results in a clean scraping of the mold, freeing the comestible therein. It will be appreciated that this configuration is adaptable to diverse forms of mold, so long as they have an axis of rotational symmetry. Thus, shapes such as a Christmas tree, rocket, wedding cake, liberty bell, or, e.g., any other conical or cylindrical object may be formed in a ball nozzle according to the present invention. It will be appreciated that as scraper 14 pivots on shaft 15, the scraper blade passes over aperture 17, effectively slicing the input stream along the contour of the inner surface of the mold. The open end of the mold cavity is a circle.

Lower mold part 11 is shown in its open position, pivoted 90° downward about shaft 32. Shaft 32 passes through collar 43 and faceplate 33 to a driving mechanism within the device housing. Attached to shaft 32 is a quarter segment of a circumferentially-toothed drive gear 42, which is driven in 90° rotational excursions by linear traverses of a rack mechanism 40. This structure is shown in greater detail in FIG. 7, discussed below.

Figure 5:
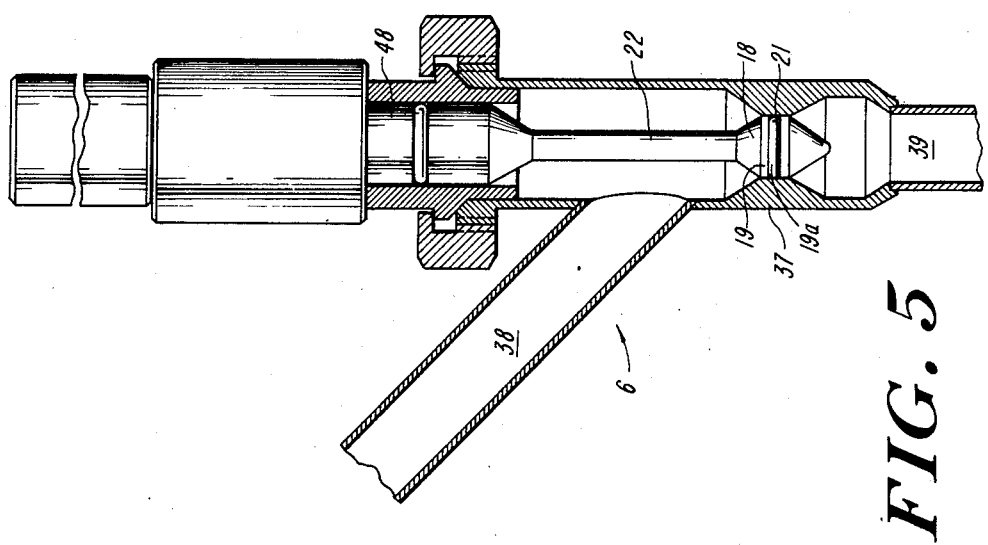

FIGS. 5 is a vertical section of the upper portion of the conduit 6 along a plane passing centrally therethrough, and shows a flow valve in a closed position. Conduit 6 includes a contoured flow control portion 37 located between a comestible supply end 38 and a mold end 39. A valve body 18 is movable therein for controlling the flow of the comestible during a molding cycle. In this embodiment, valve body 18 comprises a body functioning as a valve in part by obstruction and in part by displacement. Valve 18 includes a cylindrical portion 19 movable within a cylindrical seat 21 located within the conduit 6. An O-ring 19a provides a seal between portion 19 and seat 21. An elongate driving rod 22 from a fluid-powered cylinder 48 moves the valve body from an open position, in which portion 19 lies downstream of the cylindrical seat 21, to a closed position, in which portion 19 lies within the cylindrical seat 21.

Figure 6:
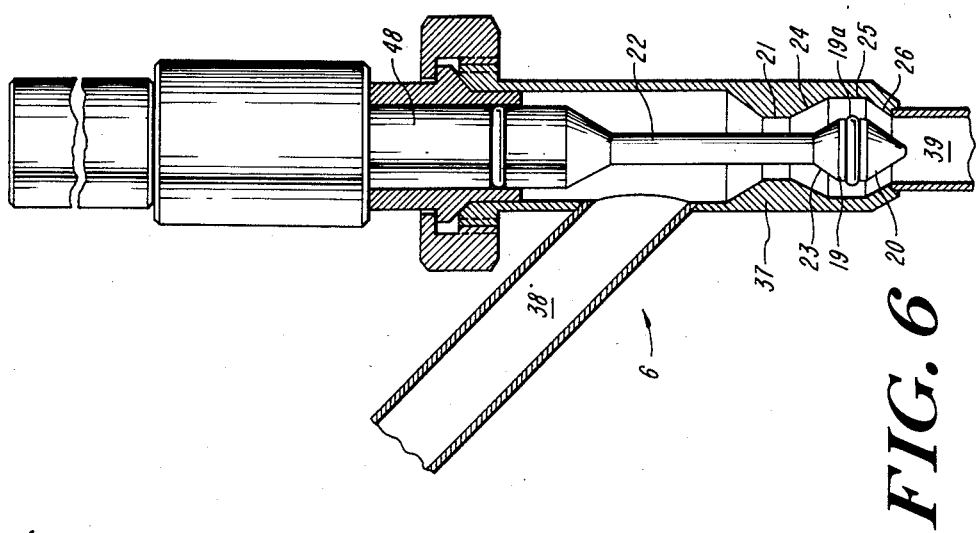
FIGS. 5 and 6 are vertical sections of the valve and conduit of the embodiment of FIG. 2.

FIG. 6 is a section identical to FIG. 5, showing the valve in an open position. Valve body 18 comprises, in addition to cylindrical portion 19, tapered upstream-facing portion 23 and a tapered nose 20. The contoured flow control, portion 37 of the conduit comprises, in addition to cylindrical seat 21, a chamber having walls 24, 25, 26 defining a contour approximately parallel to, respectively, faces 23, 19, 20 of the valve body.

With this geometry, it will be seen that, as the driving rod retracts the valve body toward the seat, the tapered nose operates to progressively restrict flow therethrough. When the cylindrical portion 19 of the valve body enters seat 21, it forms a tight seal. Thereafter, as the driving rod 22 further retracts, the piston-like motion of portion 19 within seat 21 operates to expand the chamber downstream of the valve, creating a net negative pressure, which may reverse the flow of comestible.

Figure 5A:
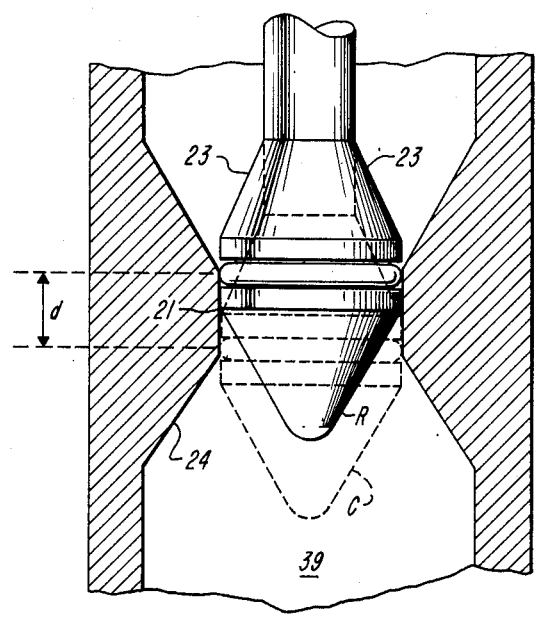
FIG. 5A is an enlarged section of the valve of FIGS. 5 and 6.

FIG. 5A is an enlarged section of the region of the seat 21 and valve body 18, and flow control portion 37. FIG. 5A shows the valve body positioned in a first closed position (C) (dotted lines) and in a second retracted closed position (R) (solid lines), within seat 21. In the first closed position (C), cylindrical portion 19 has entered cylindrical seat 21 so that flow has stopped. Nonetheless, because the comestible is compressible, the product in downstream conduit 39 and within the mold block 8 will still be under pressure. In the second retracted position (R), the valve body has retracted an additional distance d, thereby enlarging the closed downstream portion 39 of the conduit by a volume equal to d times the cross-sectional area of the seat 21. This retraction motion of the closed valve relieves the pressure in downstream conduit 39.

In a preferred embodiment of the valve, seat 21 is $\frac{3}{4}$ inch in diameter and the distance d is $\frac{3}{8}$ inch. The comestible is ice cream comprising approximately 50% air, and the volume of downstream portion 39, including a closed mold cavity, is in the range of 4–6 cubic inches. With these dimensions, the valve expands the downstream chamber by 1–5% in retracting from the (C) to the (R) position. A greater pullback volume, (a larger displacement of the valve) may be required for products molded at a higher overrun (i.e. greater proportion of included air), or molded at a higher pressure, and the optimal dimensions for a particular application may be determined by experimentation.

A further feature of the valve results from sloped faces, including upstream face 23, which, it may be seen is generally aligned with the inner wall 24 of the conduit at the entry to downstream chamber 39. As best seen in FIG. 6, the valve in a full open position has the valve body 18 centrally located in a surrounding flow chamber having walls 24,25,26 substantially parallel to valve faces 23,19,20 respectively, so as to provide smooth, angular, non-turbulent flow of comestible. Face 23, as it retracts, provides a gradual cut-off upon entering seat 21, further contributing to smooth and controlled operation.

It has been found that at the pressures necessary for driving a substantially frozen comestible into the mold, and with the consequent product compressibility, due in the case of ice cream to the inclusion of air in the food material, a certain degree of irregular pressure expansion or product splattering occurs when the mold is opened and pressure is released. Accordingly, the valve shown in FIGS. 5, 5A and 6 which, by expanding the downstream chamber, positively reduces pressure, has been found to yield a more uniform molded product. The contoured feature of the valve, contributing to its uniform flow transition between open and closed states also ensure that undue forces are not placed on the valve body which might disrupt the relative timing between the pressurization of the mold container and the opening and closing of the mold. This valve design further eliminates corners and dead spaces which could make disassembly and cleaning difficult.

Figure 7:
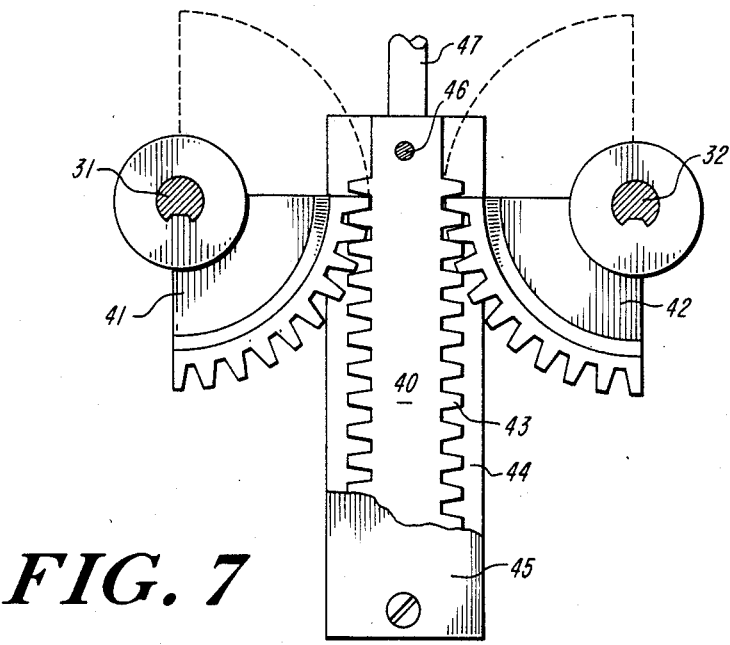
FIG. 7 is a cutaway view of a drive mechanism.
Figure 8:
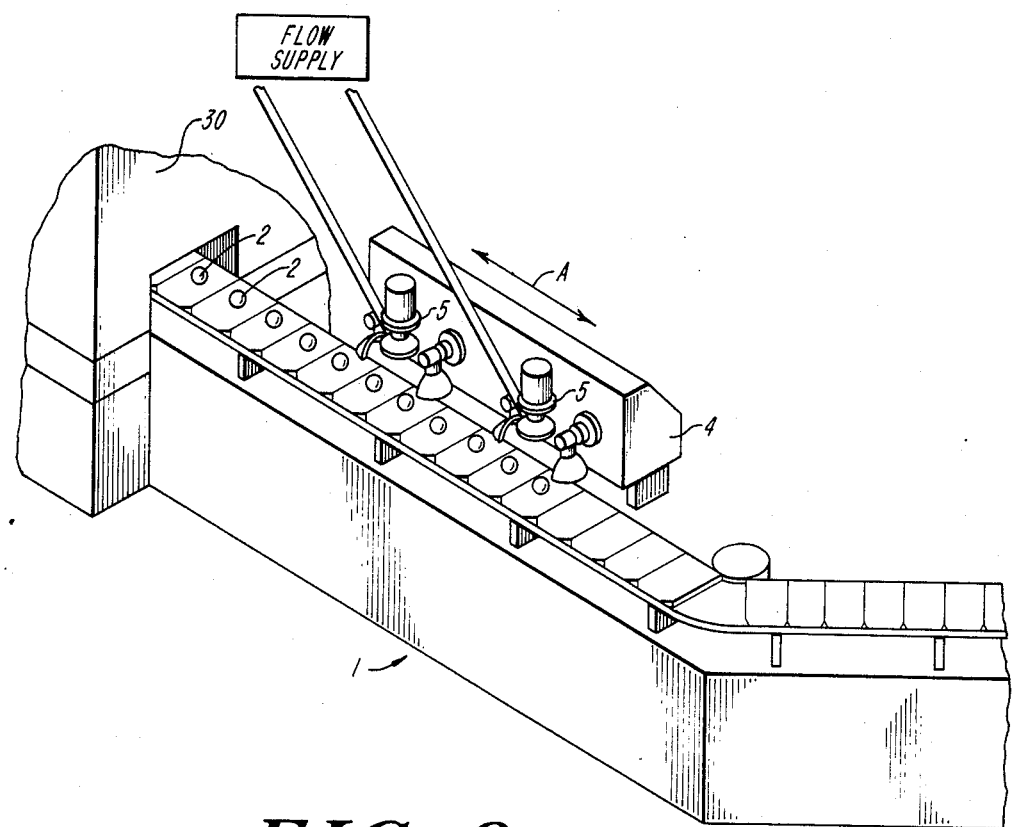
FIG. 8 is a perspective view of a multiple head embodiment of the invention.

FIG. 7 shows a detail of the drive mechanism, within the housing of the ball nozzle assembly, for moving the opposed lower mold parts 9,11 of FIG. 2. The lower mold parts are attached to respective shafts 31,32 keyed to opposing quarter-gears 41,42 which are spaced apart on opposing sides of a rack assembly 40. Rack assembly 40 comprises a double-sided rack member 43 and inner and outer side plates 44,45 covering the meshing rack and gears. The rack is connected, e.g., by a pin 46, to a drive shaft which, in the preferred embodiment, is the shaft of an air-driven cylinder. In the preferred embodiment the travel of the cylinder is only slightly longler than the 90 degree travel of the gear, and the cylinder has an adjustable "cushion" or damping adjustment at each end of its travel, adjusted to eliminate clatter of the parts 9,11 upon closing.

In the preferred embodiment, the rack, the scraper and the flow valve are each driven by pneumatic cylinders, and the synchronization of the different motions is accomplished by a sequencing valve for control of the various motions of the component parts of the invention during an actual production cycle. Preferably two or more ball nozzles are carried at each production platform, so as to simultaneously cycle through the molding and release of two or more portions of shaped comestible. The sequencing valve is preferably an electronic programmable limit switch, such as the QUIK-SET II, sold by the Gemco Electric Division of the McGraw-Edison Company, 1080 N. Crooks Road, Clawson, Mich. 48017. Such a programmable limit switch permits an interface of the operations of the present invention with a general conveyor belt assembly. The switch is characterized in having a transducer, or resolver, which converts rotary motion of, for example, a component wheel or gear on the conveyor, into an electrical signal, one rotation being representative of the passage of a receiving tray along the conveyor beneath the ball nozzle. The ON and OFF timing for each of the air valves controlling operation of the ball nozzle is programmed into the sequencing switch with a resolution which may be for instance, between 0.10 and 1 degree depending on programming. Three valves are necessary per nozzle, to control the valve for comestible flow, to drive the movable lower portions of the mold 9, 11, and to rotate the scraper 14. In addition, a manually operated selector switch is provided to override the sequencing switch to either turn all controls off or to hold all of the control valves open for bleeding, cleaning or similar operations necessary for start-up or close-down of the apparatus.

In the presently preferred embodiment for ice cream production, jet tubes having flexible air supply lines direct a stream of compressed air at the exterior surfaces of lower parts 9, 11 to maintain the temperature of these parts above freezing.

It will be understood that the foregoing invention has been described with respect to a particular embodiment having a mold of a particular shape adapted for formation of ice cream portions. It will be appreciated, however, that other mold shapes may be employed to advantage in the practice of the invention. In particular, the upper mold cavity may be of substantially any shape having a central axis of symmetry. The lower movable portions of the mold may comprise for instance a single flat plate, formed in any shape and movable into a position to close the mold during shaping of the food product, provided only that the movable portion have a contour permitting release of the molded product. Thus, for instance, a pair of flat hemidiscs or a pivoting circular disc could be used, as would be the case, for example, when forming a liberty bell shaped portion. Other shapes of arbitrary form could be formed using electric discharge machining (EDM) techniques. In this regard it would be apparent to one skilled in the art that subsidiary parts such as heater jet tubes may be used to heat the mold when used for ice cream forming, and other means of varying or maintaining the mold surface temperature, either higher or lower, may be adapted to form a releasing layer at the mold surface for diverse other comestible substances. Furthermore, while the invention has been described in an embodiment using pneumatic cylinders to power the various moving parts, mechanical, electrical, or other means of interconnecting, synchronizing or powering the various moving components may be employed, with greater or lesser ease or flexibility in adapting the machine to different production environments.

The invention, being thus disclosed, a range of different embodiments and variations will occur to those skilled in the art, and all such variations are encompassed in the invention and following claims.

What is claimed is:

1. A molding apparatus for forming comestible shapes comprising;
   a mold block having a cavity with an open end formed therein, said cavity having an axis of symmetry generally normal to a plane of said open end;
   movable means for closing the open end of said cavity during molding to retain said comestible within said cavity,
   means for providing a controllable flow of comestible in a plastic state to and from the closed mold cavity by moving a displacement body within a comestible flow path;
   scraper means pivotally mounted at only one point on said mold block for rotation within said cavity around said axis of symmetry; and
   control means for controlling the time and direction of flow of comestible to and from said cavity, the rotation of said scraper and the pending and closing of said movable means to permit shaping of said comestible within said mold cavity, and release of said shaped comestible from said mold cavity by operation of said scraper and said movable means.

2. An apparatus according to claim 1, further including means for moving the mold along repetitive lateral traverses, and wherein the control means includes means for synchronizing the motion along a traverse with release of a said shaped comestible, so that the shaped comestible is released onto a conveyor moving along the direction of a traverse without relative lateral motion of such conveyor and the shaped comestible.

3. An apparatus according to claim 2, wherein the means for synchronizing includes a resolver for developing a signal responsive to repetitive motion of a mechanical element of the conveyor, and further includes a programmable limit switch operative upon the signal developed by the resolver, for synchronizing the moving.

4. An apparatus according to claim 1, wherein the means for providing a flow of comestible into said mold cavity includes means for momentarily reversing the flow, said control means further including means for controlling said reversing of flow to occur prior to the opening of the movable means, so that pressure expansion of the molded comestible upon opening of the mold is reduced to avert overpressure molding defects.

5. An apparatus according to claim 4, further including means for moving the mold along repetitive lateral traverses, and wherein the control means includes means for synchronizing the motion along a traverse with release of a said shaped comestible, so that the shaped comestible is released onto a conveyor moving along the direction of a traverse without relative lateral motion of such conveyor and the shaped comestible.

6. An apparatus according to claim 5, wherein the means for synchronizing includes a resolver for developing a signal responsive to a rotating mechanical element of the conveyor, and further includes a programmable limit switch operative upon the signal developed by the resolver, for synchronizing the moving.

7. An apparatus for shaping molded portions of a comestible wherein the comestible is injected in a plastic state under pressure into a closed hollow mold body during a fill cycle, and a shaped portion is released from the mold body during a release cycle, such apparatus comprising:

a hollow mold body;
movable means for closing and opening the mold body;
conduit means defined by an inner wall for providing a pressurized flow of comestible material along a flow direction to the closed mold body;
valve means, including a displacement body portion located within the conduit, for providing a reversal of flow by movement of the displacement body within the conduit; and
control means for moving the movable means and the valve means so as to control the flow of comestible material into the mold body, the shaping and the release of the shaped comestible, said control means further including means for moving the displacement body so as to provide said reversal of flow before opening of the mold, so that pressure expansion of the molded product upon opening of the mold is averted.

8. An apparatus according to claim 7, wherein the hollow mold body has a volume equal to the volume of a molded portion, and wherein the means for moving the displacement body is operative to provide said reversal of flow by moving said displacement body, in pressure-sealing relationship with the inner wall and in a direction opposite the flow direction, through a volume of approximately 1-5% of the volume of a molded portion.

9. An apparatus according to claim 7, further including means for moving the mold body along repetitive lateral traverses, and wherein the control means includes means for synchronizing the motion along a traverse with release of a said shaped comestible, so that the shaped comestible is released onto a conveyor moving along the direction of the traverse without relative lateral motion of such conveyor and the shaped comestible.

10. An apparatus according to claim 9, wherein the mold body includes a mold block having a cavity with an open end formed therein, said cavity having an axis of symmetry generally normal to a plane of said open end; and further includes scraper means pivotally mounted at only one point on said mold block for rotation within said cavity around said axis of symmetry, said control means further including means for pivotally moving the scraper about said axis during the release cycle.

11. An apparatus according to claim 7, wherein the mold body includes a mold block having a cavity with an open end formed therein, said cavity having an axis of symmetry generally normal to a plane of said open end; and further includes scraper means pivotally mounted at only one point on said mold block for rotation within said cavity around said axis of symmetry, said control means further including means for pivotally moving the scraper about said axis during a release cycle.

12. An apparatus according to claim 11, wherein the hollow mold body has a volume equal to the volume of a molded portion, and wherein the means for moving the displacement body is operative to provide said reversal of flow by moving said displacement body, in pressure-sealing relationship with the inner wall and in a direction opposite the flow direction, through a volume of approximately 1-5% of the volume of a molded portion.

13. An apparatus for the production of shaped portions of a comestible comprising plural apparatuses according to any of claims 1, 2, 4, or 7, wherein at least two of said apparatuses are connected to a common means of providing flow of the comestible.

* * * * *